Aug. 6, 1968     P. G. NORBACK ET AL     3,395,903
AIR AND WATER CONTACT BODY AS EMPLOYED IN COOLING TOWERS
Filed July 15, 1966     3 Sheets-Sheet 1

INVENTOR.
Per Gunnar Norback
& George W. Meet
BY
Eric Y. Munson
Attorney

Aug. 6, 1968 P. G. NORBACK ET AL 3,395,903
AIR AND WATER CONTACT BODY AS EMPLOYED IN COOLING TOWERS
Filed July 15, 1966 3 Sheets-Sheet 2

INVENTOR.
Per Gunnar Norback
George W. Meek

> United States Patent Office 3,395,903
Patented Aug. 6, 1968

3,395,903
AIR AND WATER CONTACT BODY AS
EMPLOYED IN COOLING TOWERS
Per Gunnar Norback, 33 Askrikevagen, Lidingo, Sweden,
and George W. Meek, 1205 6th St., Page Park, Fort
Myers, Fla. 33901
Filed July 15, 1966, Ser. No. 565,459
Claims priority, application Sweden, Jan. 26, 1966,
1,039/66
4 Claims. (Cl. 261—112)

ABSTRACT OF THE DISCLOSURE

An air and water contact body such as is employed in cooling towers, the body being made up of corrugated layers of sheet material with their corrugations extending at an angle, the corrugations forming through-passing channels between them. The sheets are joined together adjacent to at least one edge of the body by an adhesive applied at said edge, the layers supporting each other over the major portion of their area without being secured together in said major portion of their area. The invention also contemplates the provision of an adherent material such as an adhesive applied at the edge of the body and which acts to form a strengthening element or bead along said edge.

---

The present invention relates to contact bodies for heat and/or steam transfer between flowing water and flowing air. An important field of use is in cooling towers. The contact bodies consist of thin layers of non-metallic material and the layers are corrugated with the folds or corrugations intersecting each other in the adjacent layers. The layers bear against each other at points on the ridges of the corrugations and adjacent layers thereby form grooves of various widths in all directions, the two flowing media meeting in said grooves. The flow directions of the media can be parallel and counter-directed or may be at angles to each other.

A structure constructed in this manner makes possible high transition, that is a high heat or steam transfer between the media per unit area of the layers. However, so that the inherent possibilities of high transfer intensity can be effectively utilized it is necessary that the ratio between the quantities of flowing media at each section of the contact body be maintained at their predetermined values. An extremely high transition number is of little value if the amount of one medium within a given section deviates, that is, is reduced substantially from that intended. The difficulty in maintaining the quantity of media at the required value exists particularly for the fluid flow. Disturbances can occur, that is, by local dissimilarities in the wettability of the layers. It has been shown that the application of binding agents along the ridges of the corrugations in long, continuous beads for the purpose of joining the layers together, has a substantial influence on the liquid distribution, in such a way that the flow of liquid is concentrated in certain portions while others are of less concentration. This creates the effect that the water tends to follow each of the obliquely, downwardly extending corrugations in its longitudinal direction instead of substantially draining in a vertical direction to underlying corrugations. The deterioration is particularly prominent when substantial differences exist between the wetting properties of the glue bead and the layer material.

An object of the invention is to eliminate these disadvantages and which purpose is attained in that the layers are, adjacent to one or more edges, secured together by means of an adhesive agent applied to the ridges of the corrugated layers, while the layers over the main portion of the same merely abut each other without being secured together. Despite the fact that these layers are combined together at relatively few contact points, a very stable and shape-retaining structure is obtained by means of the large number of contact points at which the layers contact and support each other.

The invention will be more clearly described with reference to the embodiments showing different structures as seen in the accompanying drawings in which—

Figure 1:
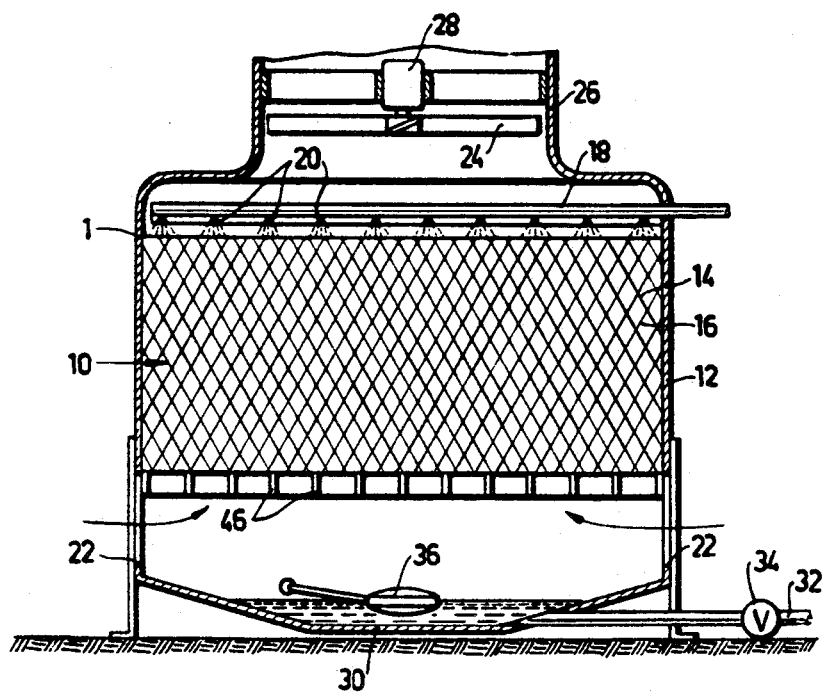
FIG. 1 is a vertical longitudinal sectional view through a cooling tower functioning in accordance with the counter-flow principle and constructed according to the invention.

In FIG. 1 a contact body is indicated at 10, the same being composed of several sets or units, which body being enclosed in a casing 12 and is passed by the two media, namely, water and air in counter flow. The contact body 10 and its separate units consist of thin layers or sheets 14, 16 which are all undulated or corrugated, with the undulations or corrugations crossing each other at each adjacent layer, whereby through-going vertical as well as horizontal grooves or channels are obtained throughout the whole contact body. These channels or grooves have a width constantly varying from zero at the contact points between the layers, to double the height of the corrugation. The height of the corrugation can reach from 5 to 20 mm. and is suitably from 10–15 mm. The thickness of the layer is some few tenths of a millimeter and said layers are made of a fibrous material, preferably a non-inflammable or at least fire-resistant material such as asbestos paper. Layer material of this kind has low water strength and is therefore impregnated with a curable or thermoplastic resin such as phenol resin or melamine, the amount of this substance being controlled so that the fibrous material after impregnation still retains good film-forming and wetting properties. The amount of resin in the layers can reach from 10–30 percent by weight.

By impregnating thin asbestos layers in the manner described in addition to obtaining the necessary wet strength, an improved mechanical strength is also secured.

The water is supplied to the cooling tower through a conduit or net-work of conduits 18 which are provided at the bottom with outlet openings 20. Arrangements for continuously or intermittently supplying and spraying the water over the upper surface of the contact body 10 can be of any known type and therefore needs no further description. Air can enter through the bottom through side openings 22 in the lower portion of the casing 12 and it is caused to flow through the grooves or channels in the contact body by means of a fan 24 mounted in an outlet 26 in the upper portion of the casing, said fan being driven by a motor 28. The bottom of the cooling tower is designed as a water sump 30 from which the cooled water is led to the place of usage by means of a conduit 32 in which a valve 34 is mounted. The level of the water in the sump 30 is regulated by means of a float mechanism 36 so that fresh water is added when required to replace the water lost by evaporation in the contact body. The water is led back from the place of usage to the conduit 18 for re-cooling.

The corrugations in the layers 14 and 16 cross each other at an angle which is less than 90 degrees and preferably within the range of from 35–75 degrees, such as about 60 degrees. Thus, the angle of slope of the corrugations to the vertical is half these values.

Figure 2:
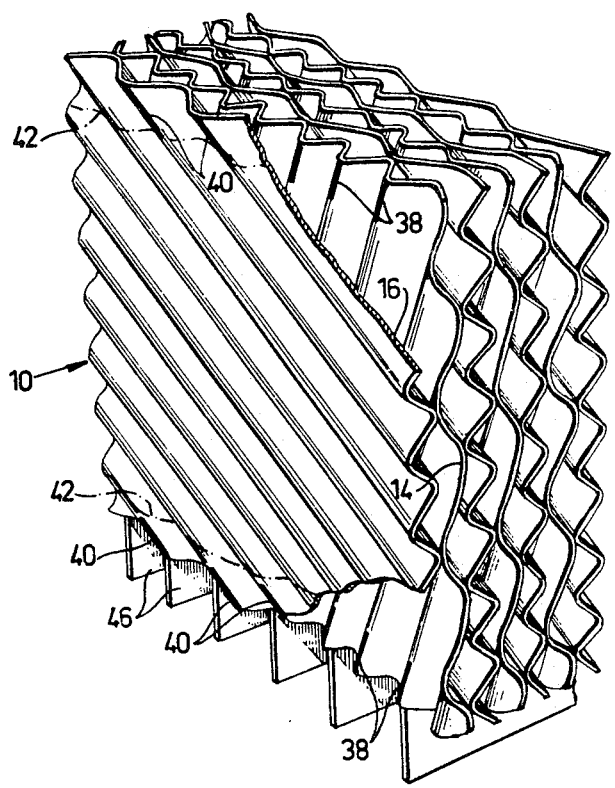
FIG. 2 is a perspective view of a portion of the contact body.

The layers 14 and 16, according to the invention, are secured together by means of glue beads, applied along the edges of said layers, preferably along the upper and lower edges. The vertical edge portions of the layers can also be joined together. According to FIG. 2, the glue beads 38, 40 are applied to the tops or backs of the corrugations in the layers 14, 16 at the upper and lower edges of said layers. The length of the glue bead is such that at least one contact point between the separate corrugation ridges in one layer and the crossing corrugation ridges in the next layer is positively located within the length of the bead. The adhesive agent can be applied to both the corrugation ridges of the layer which meet at a contact point, since in this way optimum adhesion of the glue line is obtained. Thus, the glue bead of each layer is combined with the layer over an area which is substantially greater than the area of the glue point proper between the layers.

Since the glue beads merely extend over an insignificant portion of the length of the ridges or corrugations they have practically no influence on the distribution of water over the surfaces of the layers. Thus, the layers over the major portion of their area support each other at the points of intersection without being actually secured together at these points. The adhesive substance can be either of the thermoplastic type or of a curable type. The glue beads 38, 40 are preferably of insignificant thickness, such as 0.5–1 mm. high or more, to insure positive binding action between all the layers, even though some of the layers may be warped or for some other reason deviate from the geometric shape, which distortion is difficult to avoid in practice. Thus, if gaps appear at the edges between separate pairs of layers, a positive binding effect at the contact points of the glue beads will still be had. In this respect it can be seen that it is important to keep the lengths of the glue beads short so that they do not obstruct the path of the water over the major portion of the layer surfaces of the contact body.

The mechanical strength of the layers or sheets, which are only a few tenths of a millimeter thick, can be improved by applying a plastic or resin in the form of a continuous bead 42 along the edges. This continuous bead can, although it is not a necessity, be formed of the same substance as that which serves to glue the layers together at the edges. It is particularly advantageous to apply the strengthening bead 42 to the upper and lower sides of the contact body, since it is these sides that are first subjected to the strong flow of water and which, in other cases, serves to take up the weight of the contact body when it rests on the support 46 or the like. The bead coating 42 is preferably composed of some material which is fire resistant.

Figure 3:
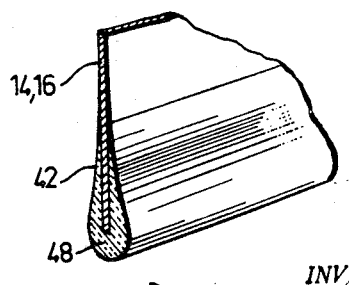
FIG. 3 shows a portion of a layer of the contact body in section.

By forming the bead 42 by immersing the layer in a bath and subsequently allowing the bead to solidify in a vertical position, said bead can be given an additional strengthening edge-bulge 48 (FIG. 3). This bulge is formed by the capillary action occurring along the edge when the fluid flows away from said edge during the solidifying period.

The bead 42 also prevents pieces of the layer, and particularly those that are relatively brittle, from breaking off and being carried away by the flow of water, and which pieces might block or throttle the flow paths in the cooling tower. The bead 42 can be made of plastic, which is softer or tougher than the layers providing these layers are composed of asbestos paper impregnated with melamine, so that the edges of the layer hold together even though said bead should be broken.

Figure 4:
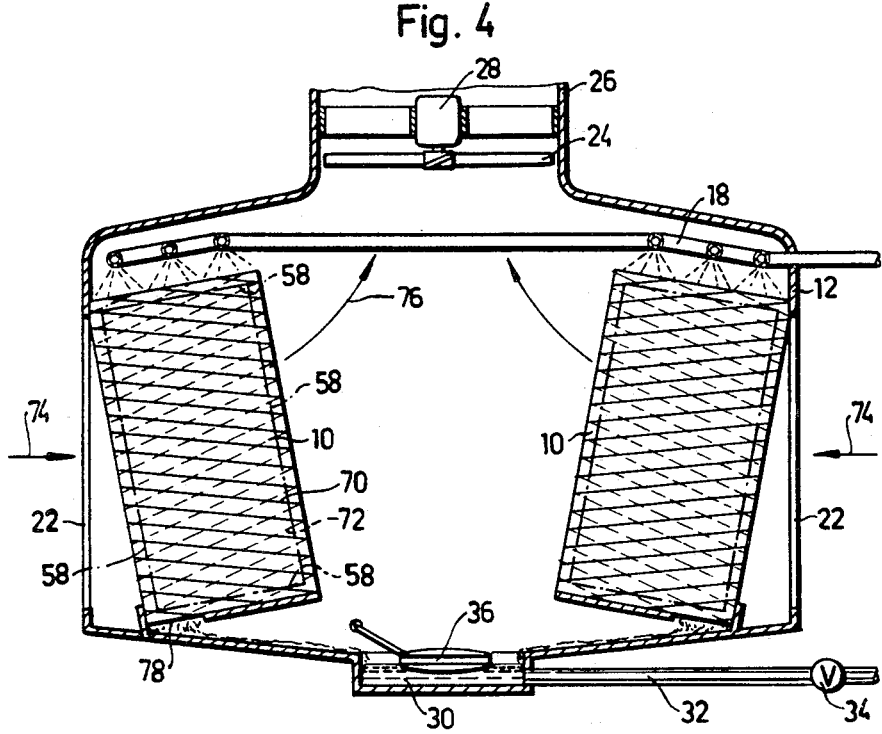
FIG. 4 is a vertical longitudinal sectional view through a cooling tower which functions according to the cross-flow principle.

In the embodiment shown in FIG. 4, contact bodies 10 of the described structure are passed in cross flow by the two fluid media. As in previous structures, the water is supplied through the jets 18 to the upper surfaces of the contact bodies and it then runs along the layers in a vertical main-flow direction. Air enters through openings 22 located on a level with a side edge of each of the contact bodies, and then flows in the direction of the arrows 74, 76 and in a horizontal direction, through the grooves, passages or channels present between the contact bodies. In the embodiment according to FIG. 4 the contact bodies have a right-angular contour and the corrugations 70 in one group of the layers has the same angle of inclination as the corrugations 72 in the other group of layers, toward the inlet edge for the air. The contact bodies are obliquely positioned, in that they are supported from a sloping floor provided with openings 78 through which the water drains to the sump 30. In this way the corrugations 72, which are directed upwardly as viewed from the flow direction 74 of the air, are given a steeper inclination relatively to the horizontal plane than if the floor was horizontal. Furthermore, the slope of the corrugations 70, which are directed downwardly when viewed from the direction of the flow 44 of the air, is reduced. The result is that means are created within the contact body which produce a retaining effect on the draining water, so that the degree to which said water is carried with the flow of air is the least possible. Consequently if it be assumed that the air flow is interrupted the oblique positioning of the contact body will cause the water to run in a direction toward a side edge of the contact body, facing the opening 78, and the air flow will blow over the down-running water toward the outlet side of the air. These two factors counter-act each other, according to the invention, so that a uniform distribtuion of water over the whole contact body is assured. The embodiment according to FIG. 5 differs from the previous embodiment in that the contact body is so mounted that its sides coincide with horizontal or vertical planes. In this case, the corrugations have been given different slopes so that the corrugations 72 associated with one group of layers forms a larger angle to the horizontal than the corrugations 20 associated with the intersecting layers. In this way the same effect is obtained as mentioned in regard to the previous embodiment.

Figure 5:
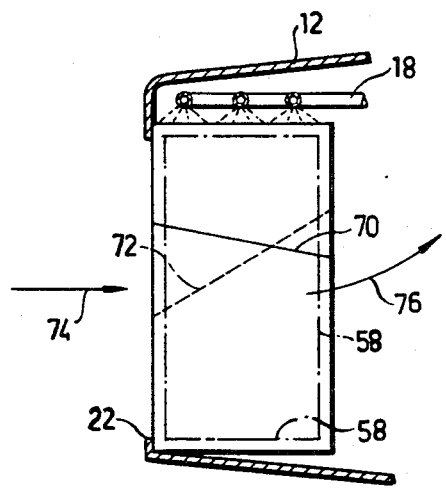
FIG. 5 shows a portion of a modified cooling tower constructed to employ the last-mentioned principle.

In the embodiments according to FIGS. 4 and 5 the angle at which the corrugations slope toward the inlet side for the air or toward the horizontal is less than 45 degrees, such as 20–35 degrees.

The layers in the contact bodies 10 in FIGS. 4 and 5 have an edge portion, defined by the dot dash lines 58 surrounding all four sides. The layers at one or more of these edge portions and primarily the vertical portions which are thus located at the long sides of the contact bodies, are mutually joined together by means of glue beads 38, 40 according to the above. One or more of the edge portions 58 may be provided with continuous edge strengthening bead 42 according to the above. Said strengthening bead 42 can thus be applied to all side edges with the exception of the inner vertical edge at the outlet side for the air. The layers inside the edge portion 48 are, in accordance with the invention, substantially free from glue beads. Because of the slope of the corrugations 70, 72 being small relative to the direction of flow of the air 74, 76 respectively, it is particularly important, with respect to the required distribution of water, that the downwardly flowing water over the inner main portion of the layer surface is not obstructed by glue beads.

In certain cases if the contact bodies are widely extended vertically or horizontally, the glue beads 38, 40 can be disposed at one or two positions between the edges. These glue beads may have a length somewhat larger than the distance between the contact points along each corrugation ridge.

The invention is not restricted to the embodiments shown but can be varied within the scope of the inventive concept. Thus, the invention can in certain cases be adapted to method of drying air by means of an aqueous solution containing an absorbing salt, such as calcium chloride or lithium chloride. Although this description specifically mentions water and air, the use of other liquids or gases are contemplated where certain conditions exist. The contact bodies can be used for heating water by means of hot air, steam mixture of hot combustion fluids and other combinations of fluids and gases.

In certain cases, the layers of the contact body may be composed of foam rubber, such as polystyrene, such layers having a thickness of from 0.5–1 mm. The bead strengtheners can be produced by means of glued-on strips which can be coated on both sides with an adhesive substance.

What is claimed is:

1. An air and water contact body such as is employed in cooling towers, said body being composed of layers of non-metallic material, said layers being corrugated and having corrugations extending at an angle, and which corrugations abut each other pointwise in adjacent layers thus forming through-passing channels for two media meeting each other in the channels, characterized in that the layers are joined together adjacent to at least one edge of the body by means of an adhesive substance applied to the ridges of the corrugated layer thereat, the layers merely supporting each other over the major portion of their area without being secured together in said major portion of their area.

2. A contact body according to claim 1, characterized in that the adhesive substance is applied as a continuous coating along the edge of the layer and preferably on both sides, to such an extent that said edge is consequently strengthened.

3. A contact body according to claim 1, characterized in that the coating of adhesive substance forms a drop-like bulge along the edge line proper.

4. A contact body according to claim 1 characterized in that the adhesive coating is applied between abutting layers at several edges only, the corrugations throughout the remainder of the body contacting at spaced points but being unsecured to one another at such points.

References Cited

UNITED STATES PATENTS

| | | | |
|---|---|---|---|
| 2,229,743 | 1/1941 | Karcher | 161—136 |
| 3,155,153 | 11/1964 | Axelsson | 261—112 |
| 3,168,432 | 2/1965 | Elfring | 161—136 |
| 3,262,682 | 7/1966 | Bredberg | 261—112 |

FOREIGN PATENTS

| | | |
|---|---|---|
| 928,602 | 6/1963 | Great Britain. |

HARRY B. THORTON, *Primary Examiner.*

TIM R. MILES, *Assistant Examiner.*